UNITED STATES PATENT OFFICE.

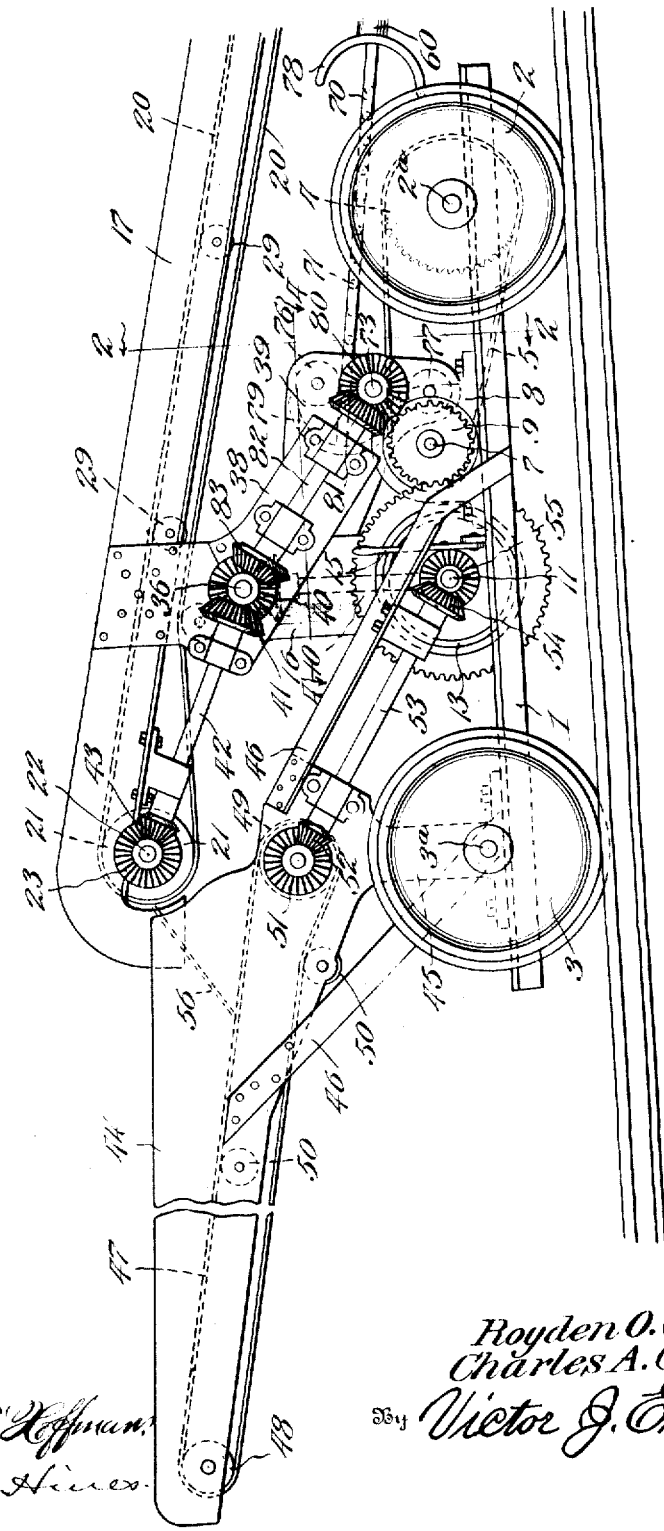

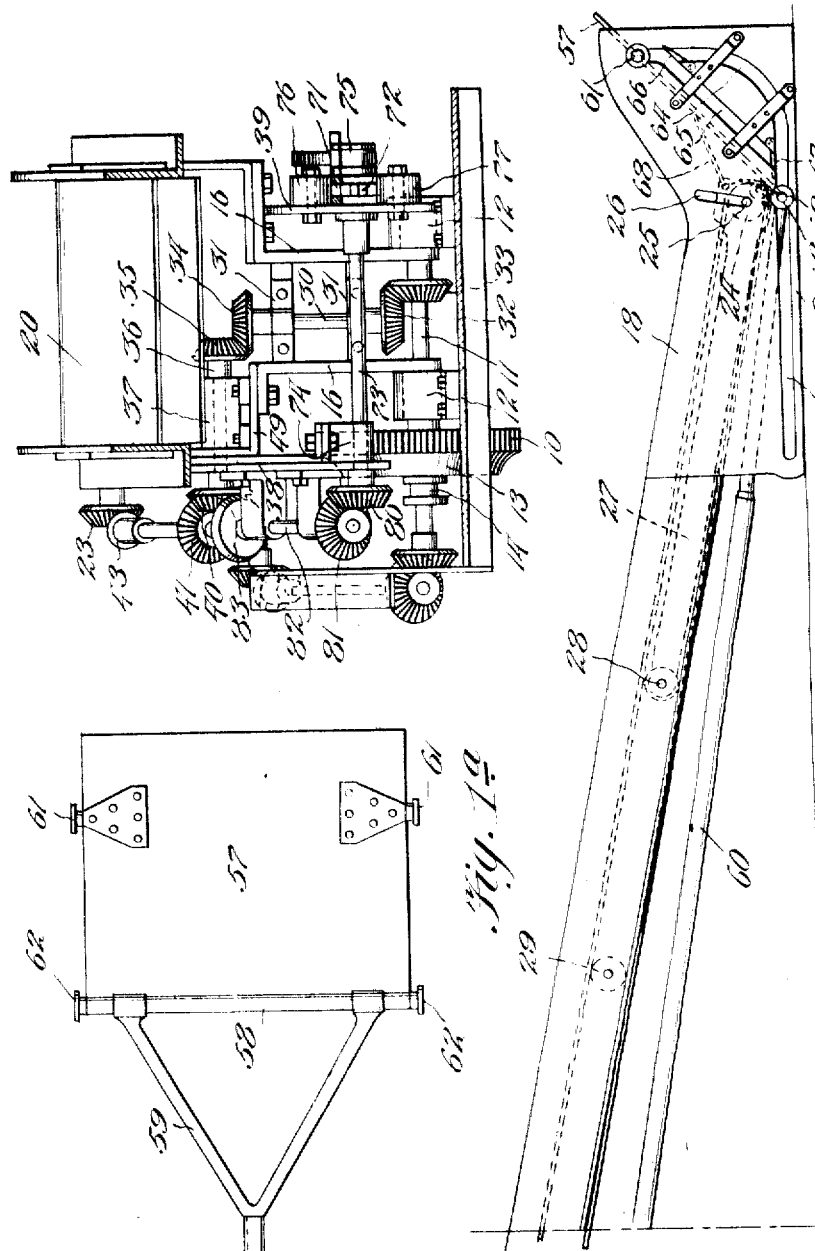

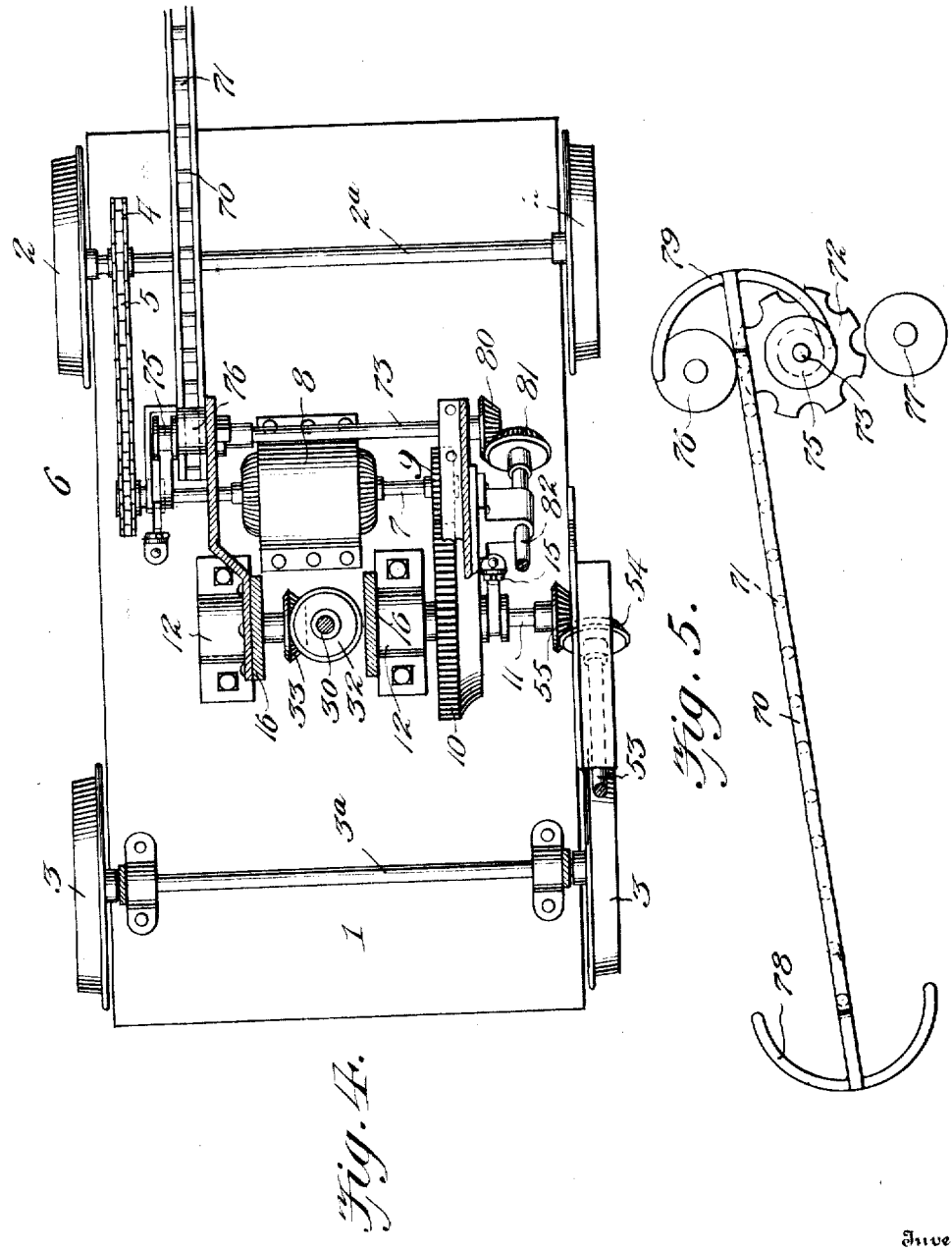

ROYDEN O. COUCH, OF CHARLESTON, AND CHARLES A. CABELL, OF CARBON, WEST VIRGINIA.

LOADING DEVICE.

No. 908,395.

Specification of Letters Patent.

Patented Dec. 29, 1908.

Application filed May 15, 1908. Serial No. 433,077.

*To all whom it may concern:*

Be it known that we, ROYDEN O. COUCH and CHARLES A. CABELL, citizens of the United States, residing at Charleston and Carbon, respectively, in the county of Kanawha and State of West Virginia, have invented new and useful Improvements in Loading Devices, of which the following is a specification.

This invention relates to improvements in loading devices, comprehending an apparatus for loading coal or other loose material from the ground or floor into cars or other receptacles or transferring the material from one point to another.

The principal object of the invention is to provide a comparatively simple and inexpensive construction of loading device for loading cars in mines or elsewhere, and which is adapted to operate rapidly and economically.

With this and other objects in view, the invention consists of the novel features of construction, combination and arrangement of parts hereinafter fully described and claimed, reference being had to the accompanying drawings, in which:—

Figures 1 and 1ª represent collectively a side elevation of our improved loading apparatus. Fig. 2 is a vertical transverse section on line 2—2 of Fig. 1. Fig. 3 is a bottom plan view of the scoop or shovel and connecting parts. Fig. 4 is a sectional view through the transmission and clutch gears. Fig. 5 is a detail view of the ratchet and pinion mechanism for operating the scoop or shovel.

Referring now more particularly to the drawings, the numeral 1 designates a supporting platform, which may be stationary or movable, as circumstances may require. In the present instance, the platform comprises a truck mounted on front and rear sets of supporting wheels 2 and 3 adapted to traverse track rails. The axles 2ª and 3ª of these wheels are suitably journaled upon the platform or truck body, and to the axle 2ª or one of wheels 2 is fixed a sprocket wheel 4 connected by a chain 5 with a pinion 6 on a main drive shaft 7 mounted in suitable bearings 8. The shaft 7 is designed in practice to be driven by a suitable motor, not shown, mounted on the truck, which motor may be electrically or otherwise driven. By the driving mechanism just described the truck supporting the parts of the apparatus may be propelled back and forth upon the track, as will be readily understood. On the shaft 7 is a spur drive gear 9 which meshes with a transmitting gear 10 on a power-transmitting shaft 11 journaled in bearings 12 on the truck in rear of said shaft 7. The gear 10 is loose on the shaft 11 and is adapted to be engaged by a friction clutch 13 feathered to slide on and rotate with the shaft, said clutch having connected therewith a grooved collar 14 operatively connected with a shifting lever 15, by which the clutch may be thrown into and out of action.

Supported by the shaft 11 and extending upwardly therefrom is a pair of spaced standards 16, forming part of the supporting frame for the gearing of the apparatus. Secured adjacent its rear ends to the upper ends of the standard is a feed conveyer frame 17 comprising suitably connected spaced side-boards, secured at their forward ends to plates 18, the lower edges of which are arranged to form shoes or runners 19 to slide upon the surface of the floor or ground. A feed conveyer 20, in the form of an endless apron, is carried by said frame 17 and passes at its upper rear end around the guide roll 21, on one end of the shaft 22 of which is a beveled gear 23. The forward end of the apron passes around a guide-roll 24, the shaft 25 of which has its ends arranged to slide vertically in slots 26 in the plates 18, and this shaft is journaled for rotation in the forward end of a pair of arms 27 disposed between the upper and lower stretches of the conveyer and pivotally mounted at their rear ends upon a transverse shaft 28 supported by the conveyer frame, said arms forming a swinging frame permitting the roll 24 to have an up and down movement for a purpose hereinafter described. Between the rolls 21 and 24 the conveyer runs in contact with and is supported by idle rolls 29, the lower one of which is mounted on the shaft 28.

A vertical shaft 30 is journaled in cross bearings 31 connecting the standards 16 and carries at its lower end a bevel-gear 32 meshing with a bevel-gear 33 on the power transmission shaft 11. On the upper end of this shaft 30 is a similar gear 34 meshing with a bevel gear 35 on a horizontal transverse shaft 36 journaled in the bearing 37 supported partly by one of the standards 16 and partly by an oblique frame plate 38 secured at its forward end to a bracket 39. The outer end of the shaft 36 projects through the plate 38 and carries a bevel gear 40 meshing with a bevel gear 41 on a shaft 42 journaled in bearings on the outer side of the adjacent standard 16 and the upper rear portion of the conveyer frame 17, the upper rear end of said shaft 42 carrying a bevel-pinion 43 meshing with the gear 23, by which, when the transmission gear 10 is clutched to the shaft 11, motion will be communicated to drive the conveyer.

The upper rear end of the conveyer frame 17 overhangs the inner forward end of a delivery conveyer frame 44 similar in general construction to the frame 17. The frame 44 is supported by uprights 45 integral with the bearings of the axle 3ª, and is stayed from the truck by braces 46. A conveyer apron 47 is mounted in said frame 44 to travel over rolls 48 and 49 and in contact with suitable supporting idlers 50. The inner roll 49 has attached to one end of its shaft a bevel gear 51 meshing with a pinion 52 on the upper rear end of a shaft 53 journaled in bearings upon the conveyer frame and one of the braces 46 and carrying at its lower forward end a bevel gear 54 meshing with a gear 55 on the transmission shaft 11, by which the delivery conveyer will operate simultaneously with the feed conveyer when the gear 10 is clutched to said transmission shaft. The material discharging from the gear elevated end of the apron 20 falls upon an inclined guide plate or conductor 56 by which it is led to and deposited upon the upper surface of the delivery conveyer 47.

In practice, the frame of the apparatus in entirety is preferably made of angle-iron or steel with its parts bolted or riveted together, thus securing durability and strength with lightness of structure. The feed apron frame inclines downwardly and forwardly from the truck so that the runner frame formed by the plates 18 at the front thereof will rest squarely upon and be supported by and may slide over the surface of the floor or ground as the apparatus is propelled forwardly or backwardly. The delivery conveyer frame 44 may extend on an upward and rearward inclination, as shown, to deliver the gathered material into a car or other receptacle, or may be arranged to extend in any direction or at any angle as circumstances may require to deposit the material upon the ground at any point in rear of the apparatus and upon either side of the track way.

In order to increase the efficiency of the apparatus, the parts may be mounted upon a turn-table or otherwise constructed to swing in order that the gathering mechanism, hereinafter described, may be moved in various directions to take up the material and the delivery conveyer shifted to discharge the material at a desired elevation or angle. Such means for mounting the parts may be of any of the ordinary types in common use, and hence I have not deemed it necessary to show the application of the same to the apparatus.

The gathering mechanism for taking up and conducting the material to the feed conveyer comprises a scoop or shovel 57, shown in Fig. 3 in the form of a rectangular plane hinged by a transverse rod or shaft 58 to a yoke 59 on the forward end of an operating rod 60. The yoke extends beneath the lower end of the feed conveyer, while the shovel 57 is in guided connection with the runner frame plates 18 for movement beneath the forward end of the conveyer and in advance thereof. As shown, the shovel 57 and shaft 58 are provided respectively with flanged rollers 61 and 62 to travel in slots 63 extending longitudinally in the runners 19 or lower portions of the frame plates 18, which slots are formed with upwardly and forwardly curved front terminals 64. In operation, the rod 60 is reciprocated back and forth to actuate the shovel, which on its forward movement is forced into the material to take up a portion thereof and is caused by the form of the slot ends 64 to swing upwardly and rearwardly at an oblique angle at the end of its traverse, by which the material will be elevated to an inclined position for travel by gravity to the feed conveyer. The front and rear terminals of each slot portion 64 are connected by an oblique by-pass slot 65, through which the rollers 61 on the shovel are adapted to travel on the rearward motion of the shovel, by which the shovel will be maintained in its upwardly inclined position until its forward end passes the lower end of the feed conveyer, thus providing for the discharge of all the material by gravity therefrom onto the conveyer.

Pivoted dogs or latches 66 and 67 are provided at the points of junction of the slots 65 with the ends of the slots 64 to respectively prevent return of the rollers 61 through the slots 64 on the back movement of the shovel and upward passage of said rollers into the slots 65 on the forward movement of the shovel. When, in the forward travel of the shovel, the rollers 61 approach the upper ends of the slots 64 and strike the dogs 66 the latter swing upwardly to permit passage of said rollers into the upper ends of the slots 65, and then drop back to normal position to guide the rollers down into the slots 65 and prevent their return through the slots 64 on the back motion of the shovel. Similarly the dogs 67 swing downward to permit the rollers 61 to pass from the slots 65 to the slots 63 and close said slots 65 against the upward movement of the rollers therethrough when the shovel is forced forward. Hence it will be seen that provision is made for operating the shovel in such a manner as to slide it beneath the material and then elevate it to retain the material taken up and discharge the same onto the conveyer 20, by which it is delivered to the conveyer 47 for final discharge.

A combined scraper and chute plate 68 is pivoted to the front end of the frame 27 and rests at its free edge upon the shovel. This plate 68 covers the angle between the forward end of the feed conveyer and the shovel and guides the material from the shovel to the conveyer. The plate swings upwardly with the shovel and downwardly therewith, and as the shovel is retracted slides upon the surface of the same thus clearing the shovel of all the particles of material and conducting the same to the conveyer. As the shovel reciprocates and tilts in its movements the lower end of the conveyer, through the frame 27, swings vertically therewith, the shaft 25 in such action traveling in the slots 26, whereby a close relationship between the parts is maintained at all times. In order to reduce the friction between the shovel and forward edges of the frame arms 27, the latter are provided with rollers 69 which travel in contact with the shovel, as will be readily understood.

The mechanism for reciprocating the shovel is constructed as follows: Connected to the rear end of the rod 60 is a rack bar 70 carrying transverse rollers 71 adapted to engage recesses in the periphery of an actuating wheel or gear 72 mounted on a shaft 73 journaled at one end in the bracket 39 and at its opposite end in a bearing 74. The gear 72 is arranged upon the end of the shaft projecting beyond the bracket 39, on which is also a contact roller 75 disposed on the outer side of the gear, and journaled on the bracket 39 above and below the gear are guide wheels or rollers 76 and 77 spaced sufficiently from the gear for the passage of the rack bar in its respective back and forth movements. The bar 70 is adapted on its forward movement to mesh with the upper surface of the gear 72 and to be held in contact therewith by the roller 76, and on its rearward movement to mesh with the under surface of said gear and to be held in contact therewith by the roller 77. The teeth or rollers 71 upon the bar terminate some distance from the respective ends thereof, and at the front and rear ends of the bars and offset laterally therefrom to engage the contact roller 75 are segmental shoes or guide members 78 and 79. The gear 72 rotates constantly in a forward direction and transmits corresponding motion to the rack bar when the latter is in engagement with the upper surface thereof to propel the shovel forward. When the rear tooth or roller 71 comes into engagement with a recess in the gear, the shoe 79 simultaneously engages the contact roller 75, thus holding said tooth in mesh with the gear, whereby the rear end of the rod travels downwardly and forwardly with the gear until it is brought to a position between the gear and lower guide roller 77, when the guiding action of the shoe 79 and roller 75, in which the roller rides on the shoe as the latter descends, brings the rear end of the bar into the space between the gear and lower guide roller 77, whereby the motion of the gear will move the rod rearwardly to retract the shovel. When the limit of the rearward movement of the bar is reached, the forward end piece thereon connects the bar with the gear in like manner for a reversal of the bar, and the shoe 78 engages the roller 75 and guides the bar in its movement until its forward end travels around the gear and is brought into position between the same and the roller 76, whereupon a meshing engagement will be instituted to again propel the bar forwardly. By means of this automatic shifting mechanism, the necessity of manually operating parts of the apparatus to control the shovel in its backward and forward movements is avoided. On the opposite end of the shaft 73 from the gear 72 is a bevel gear 80 which meshes with a similar gear 81 on the lower end of a shaft 82 journaled in the bracket 38, which shaft carries at its upper end a bevel-pinion 83 meshing with the gear 40 on the shaft 36, by which both the feed conveyer and shovel operating mechanism are driven from the shaft 11 through the intermediate shaft 30. Hence it will be seen that by means of the clutch 13 both of these sets of gearing may be simultaneously thrown into and out of operation.

It will of course be understood that suitable means is provided for throwing the pinion 6 into and out of action when it is desired to propel the apparatus or bring it to a stop. The back and forth motion of the machine may be secured by the use of a reversible engine whereby the shaft 7 may be driven in either direction, or said shaft may be driven constantly by the engine in one direction and suitable reversing gearing provided for use in conjunction with the gear 9. The means for throwing the pinion 6 into and out of action may vary, but preferably said pinion is loosely mounted on the shaft 7 and clutch mechanism employed to connect it thereto. This clutch mechanism may be of any ordinary or suitable type.

From the foregoing description, taken in connection with the drawings, the construction and mode of operation of the device will be readily understood, and it will be seen that an apparatus of comparatively simple construction is provided whereby the operation of loading coal and other materials may be quickly and economically carried out.

Having thus described the invention, what we claim as new is:—

1. In a loading apparatus, a conveyer, a shovel arranged to slide beneath and in advance of the conveyer, guiding means for forcing the shovel upwardly at the limit of its forward movement to an inclined position and bringing it back to a horizontal position upon its rearward movement, a guide for conducting the material from the shovel to the conveyer, and means for operating the conveyer and reciprocating the shovel.

2. In a loading apparatus, a conveyer, a reciprocating shovel, guiding means for sliding the shovel forwardly, tilting it upwardly, and causing it to move in an inclined position for a portion of its backward travel, a chute pivotally mounted upon the conveyer and in sliding contact with the shovel, and means for operating the conveyer and reciprocating the shovel.

3. In a loading apparatus, a conveyer, means for permitting the tilting action of the receiving end thereof, a shovel arranged to slide beneath and in advance of the conveyer, guiding means for projecting the shovel upwardly to an inclined position at the end of its forward travel and causing it to recede in such position for a portion of its backward travel, a chute pivotally connected to the tilting end of the conveyer and riding in contact with the shovel, and means for operating the conveyer and reciprocating the shovel.

4. In a loading apparatus, a conveyer having a vertical tilting movement at its receiving end, a sliding shovel arranged for movement beneath and in advance of the receiving end of the conveyer, means for tilting the shovel to an upwardly inclined position on the forward portion of its movement and withdrawing it in such position until it passes beneath the conveyer, a conductor pivoted to the conveyer and in sliding contact with the shovel, means for operating the conveyer, and means for reciprocating the shovel, said means including automatically reversible rack and pinion gearings.

5. In a loading apparatus, a frame including a pair of guide plates, said plates being provided with horizontal guideways curved upwardly at their forward ends, and oblique guide-ways connecting each horizontal guide-way with the upper end of the curved portion thereof, guard dogs at the points of intersection of the guide-ways, a conveyer having its receiving end located adjacent the guide-way and mounted for vertical movement, a shovel provided with rollers to travel said guide-ways, a chute pivotally mounted upon the conveyer and resting loosely upon the shovel, means for operating the conveyer and means for reciprocating the shovel.

6. In a loading apparatus, a reciprocating shovel, drive gearing including a pinion, a rack bar connected with the shovel, and means for shifting the bar at the limits of its movements for actuation in reverse directions by the pinion.

7. In a loading apparatus, a suitable supporting frame, a conveyer carried thereby, a reciprocating shovel arranged to deposit the material taken up thereby onto the conveyer, means for driving the conveyer, drive gearing for the shovel including a pinion, guide rollers disposed above and below the pinion, a contact roller disposed at one side of the pinion, a rack bar connected with the shovel and adapted to be operated in reverse directions by the pinion, and contact shoes upon the ends of the bar adapted to coöperate with said roller to guide the bar in its reversing movements.

8. In a loading apparatus, a supporting frame, feed and delivery conveyers carried thereby, a reciprocatory shovel, means for controlling said shovel and associated therewith to deliver the material taken up thereby onto the feed conveyers, driving means for the conveyers, and driving means for the shovel, said means including an automatically reversible rack and pinion gearing.

In testimony whereof we affix our signatures in presence of two witnesses.

ROYDEN O. COUCH.
CHAS. A. CABELL.

Witnesses:
E. C. HANNA,
T. W. DEW.